(12) United States Patent
Miller et al.

(10) Patent No.: US 6,542,654 B1
(45) Date of Patent: Apr. 1, 2003

(54) RECONFIGURABLE OPTICAL SWITCH AND METHOD

(75) Inventors: Robert O. Miller, Carrollton, TX (US); Jeffrey A. Reed, Garland, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/902,908

(22) Filed: Jul. 10, 2001

(51) Int. Cl.$^7$ .............................. G02B 6/26; G02B 6/00
(52) U.S. Cl. ............................. 385/16; 385/15; 385/17; 385/122
(58) Field of Search ............................. 385/15, 16, 17, 385/14, 129, 130, 131, 122, 125, 40; 359/241

(56) References Cited

U.S. PATENT DOCUMENTS

| | | | |
|---|---|---|---|
| 5,045,897 A | 9/1991 | Ahlgren | 357/17 |
| 5,525,541 A | 6/1996 | Krauz et al. | 437/161 |
| 5,543,353 A | 8/1996 | Suzuki et al. | 437/127 |
| 5,910,256 A | 6/1999 | Tsunetomo et al. | 216/24 |
| 5,955,749 A | 9/1999 | Joannopoulos et al. | 257/98 |
| 5,973,823 A | 10/1999 | Koops et al. | 359/322 |
| 5,990,850 A | 11/1999 | Brown et al. | 343/912 |
| 5,999,308 A | 12/1999 | Nelson et al. | 359/321 |
| 6,064,506 A | 5/2000 | Koops | 359/237 |
| 6,064,511 A | 5/2000 | Fortmann et al. | 359/321 |
| 6,075,915 A | 6/2000 | Koops et al. | 385/125 |
| 6,175,671 B1 | 1/2001 | Roberts | 385/14 |
| 6,456,416 B1 * | 9/2002 | Ichimura et al. | 359/241 |
| 2001/0026659 A1 * | 10/2001 | Sekine et al. | 385/40 |
| 2001/0026668 A1 * | 10/2001 | Yamada | 385/125 |

OTHER PUBLICATIONS

I. El–Kady et al., "Metallic Photonic Crystals at Optical Wavelengths," Physical Review B, vol. 62, No. 23, p. 299–302, Dec. 15, 2000.

B. Temelkuran et al., "Experimental Investigation of Layer–by–Layer Metallic Photonic Crystals," IEE Proceedings, vol. 145, No. 6, p. 409–414, Dec. 1998.

K. M. Ho et al., "Photonics Band Gaps in Three Dimensions: New Layer–by–Layer Periodic Structures," Solid State Communications, vol. 89, No. 5, p. 413–416, 1994.

K. M. Ho et al., "Existence of a Photonic Gap in Periodic Dielectric Structures," Physical Review Letters, vol. 65, No. 25, p. 3152–3155, Dec. 17, 1990.

* cited by examiner

Primary Examiner—Georgia Epps
Assistant Examiner—Jack Dinh
(74) Attorney, Agent, or Firm—Baker Botts L.L.P.

(57) ABSTRACT

A method for reconfiguring an optical switch includes selecting a first path through a photonic crystal. The crystal includes the first path having a plurality of first regions and a second path having a plurality of second regions. The crystal also includes a third path that provides an optical signal for propagation through one of the first and second paths. The method also includes heating at least one of the first regions and at least one of the second regions. The method further includes cooling the first region at a first rate to place the first region in a first state. The first state allows propagation of the optical signal through at least a portion of the crystal. In addition, the method includes cooling the second region at a second rate to place the second region in a second state. The second state reduces the propagation of the optical signal through at least a portion of the crystal.

35 Claims, 5 Drawing Sheets

RECONFIGURABLE OPTICAL SWITCH AND METHOD

RELATED APPLICATIONS

This application is related to:

U.S. application Ser. No. 09/898,926 filed on Jul. 3, 2001 for a "Reconfigurable Optical Device and Method"; and U.S. application Ser. No. 09/902,858 filed on Jul. 10, 2001 for a "Method for Making a Reconfigurable Optical Switch."

TECHNICAL FIELD OF THE INVENTION

This invention relates generally to the field of optical devices, and more specifically to a reconfigurable optical switch and method.

BACKGROUND OF THE INVENTION

Photonic crystals may be used to manipulate light in optical devices, such as photonic bandgap devices. A photonic crystal typically includes regions periodically composed of materials with different refractive indices. The periodic changes in the refractive index of the crystal prevent light within a certain range or "band" of frequencies from entering or leaving the crystal. The band of frequencies that cannot propagate through the crystal may be referred to as a "bandgap." To allow light within this band of frequencies to pass through certain paths in the photonic crystal, defects are created in the crystal. These defects represent points where the periodic changes in the refractive index of the crystal have been interrupted, which breaks the symmetry of the crystal. As a result of these defects, light may exist in localized states within the bandgap. Sequences of defects allow light within the bandgap to propagate through the crystal in paths created by the defects. These paths may be referred to as "waveguides." The waveguides control how light is transported through the crystal, so the waveguides control how the optical device operates.

SUMMARY OF THE INVENTION

According to the present invention, problems and disadvantages associated with previous optical switches and methods have been substantially reduced or eliminated.

In one embodiment of the invention, an optical switch includes a photonic crystal and a controller. The photonic crystal includes a first path having a plurality of first regions. At least one of the first regions is set to a first state to allow an optical signal to propagate through at least a portion of the crystal. The photonic crystal also includes a second path having a plurality of second regions. At least one of the second regions is set to the first state. The photonic crystal further includes a third path coupling the first path and the second path and providing the optical signal for propagation through at least one of the first and second paths. In addition, the photonic crystal includes a first actuator coupled to at least one of the first regions, and a second actuator coupled to at least one of the second regions. The controller is coupled to the first and second actuators. The controller is operable to switch the first and second regions between the first state and a second state. The second state reduces the propagation of the optical signal through at least a portion of the crystal.

In another embodiment of the invention, a photonic crystal includes a first path having a plurality of first regions. At least one of the first regions is set to a first state to allow an optical signal to propagate through at least a portion of the crystal. The photonic crystal also includes a second path having a plurality of second regions. At least one of the second regions is set to the first state. The photonic crystal further includes a third path coupling the first path and the second path and providing the optical signal for propagation through at least one of the first and second paths. The photonic crystal also includes a first actuator coupled to at least one of the first regions. The first actuator is operable to switch the first region between the first state and a second state. The second state reduces the propagation of the optical signal through at least a portion of the crystal. In addition, the photonic crystal includes a second actuator coupled to at least one of the second regions. The second actuator is operable to switch the second region between the first state and the second state.

In yet another embodiment of the invention, a method for reconfiguring an optical switch includes selecting a first path through a photonic crystal. The crystal includes the first path and a second path. The first path includes a plurality of first regions, and the second path includes a plurality of second regions. The crystal also includes a third path coupling the first path and the second path and providing an optical signal for propagation through one of the first and second paths. The method also includes heating at least one of the first regions and at least one of the second regions. The method further includes cooling the first region at a first rate to place the first region in a first state. The first state allows propagation of the optical signal through at least a portion of the crystal. In addition, the method includes cooling the second region at a second rate to place the second region in a second state. The second state reduces the propagation of the optical signal through at least a portion of the crystal.

Numerous technical advantages are provided according to various embodiments of the present invention. Particular embodiments of the invention may exhibit none, some, or all of the following advantages depending on the implementation. For example, the present invention may allow waveguides in an optical switch to be reconfigured. In one embodiment, a photonic crystal includes rods of a material, such as a chalcogenide. At least one of the rods may switch between a first state and a second state. In the first state, a defect forms in the photonic crystal, and an optical signal may propagate through at least a portion of the crystal. In the second state, no defect forms around the rod, which reduces the propagation of the optical signal through at least a portion of the crystal. In a particular embodiment, a defect may be formed by heating a rod and cooling the rod at one rate, and a defect may be removed by heating the rod and cooling the rod at another rate. By switching the states of the rods, the present invention allows the waveguides in a photonic crystal to be reconfigured. This allows the optical switch to be reconfigured so that the switch may route optical signals to different destinations.

The present invention may also allow the waveguides in the optical switch to be reconfigured more easily than conventional systems. For example, the present invention may vary the refractive index of the rods to a greater degree than previous systems could achieve. The present invention may also change the refractive index of the rods faster than conventional systems.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF EXAMPLE EMBODIMENTS

Figure 1:
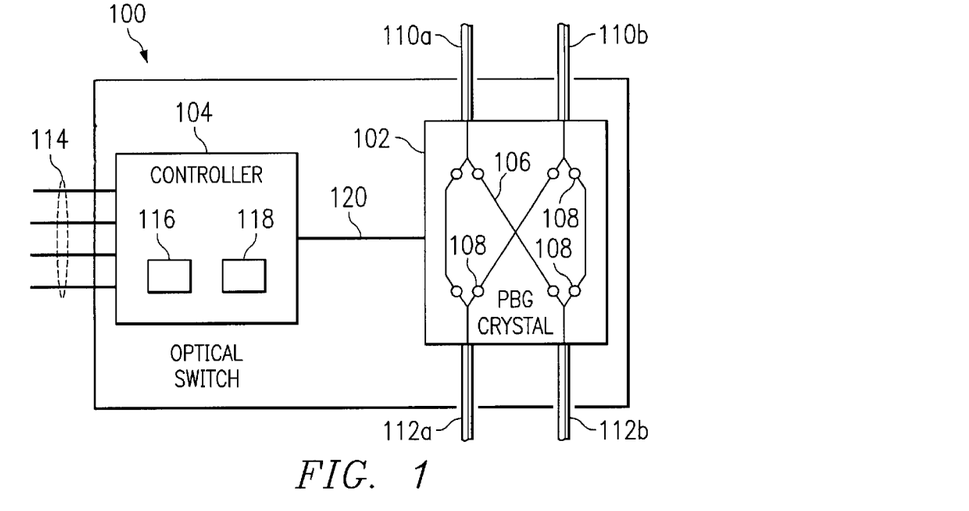
FIG. 1 is a block diagram illustrating an exemplary optical switch constructed according to the teachings of the present invention.

FIG. 1 is a block diagram illustrating an exemplary optical switch 100 constructed according to the teachings of the present invention. In the illustrated embodiment, switch 100 includes a photonic bandgap (PBG) crystal 102 and a controller 104. Other embodiments of switch 100 may be used without departing from the scope of the present invention.

In one aspect of operation, crystal 102 contains waveguides 106. Waveguides 106 represent areas of crystal 102 where light may exist in and propagate through defects in crystal 102. In one embodiment, crystal 102 includes one or more rods 108 operable to switch between at least a first state and a second state. Rods 108 that are operable to change states may be referred to as "switchable" rods. A defect exists in crystal 102 when rod 108 is in the first state, and light may exist in and propagate through the defect. A defect is removed from crystal 102 by switching rod 108 from the first state to the second state, which reduces or eliminates the propagation of light through that rod 108. In a particular embodiment, defects in crystal 102 may be formed by heating and cooling rod 108 at one rate, and defects may be removed in crystal 102 by heating and cooling rod 108 at another rate. By changing the states of rods 108, crystal 102 may be reconfigured to perform different switching functions. For example, by reconfiguring waveguides 106, switch 100 could reconfigure crystal 102 to route input signals from input lines 110a–110b (referred to generally as input lines 110) to different output lines 112a–112b (referred to generally as output lines 112). Other embodiments and/or uses of crystal 102 may be used without departing from the scope of the present invention. In the illustrated embodiment, crystal 102 has been simplified to illustrate the various components of crystal 102. For example, crystal 102 may include any suitable number of waveguides 106 and rods 108 without departing from the scope of the present invention. Also, crystal 102 may receive input signals from any number of input lines 110 and deliver optical signals to any number of output lines 112.

Figure 2A:
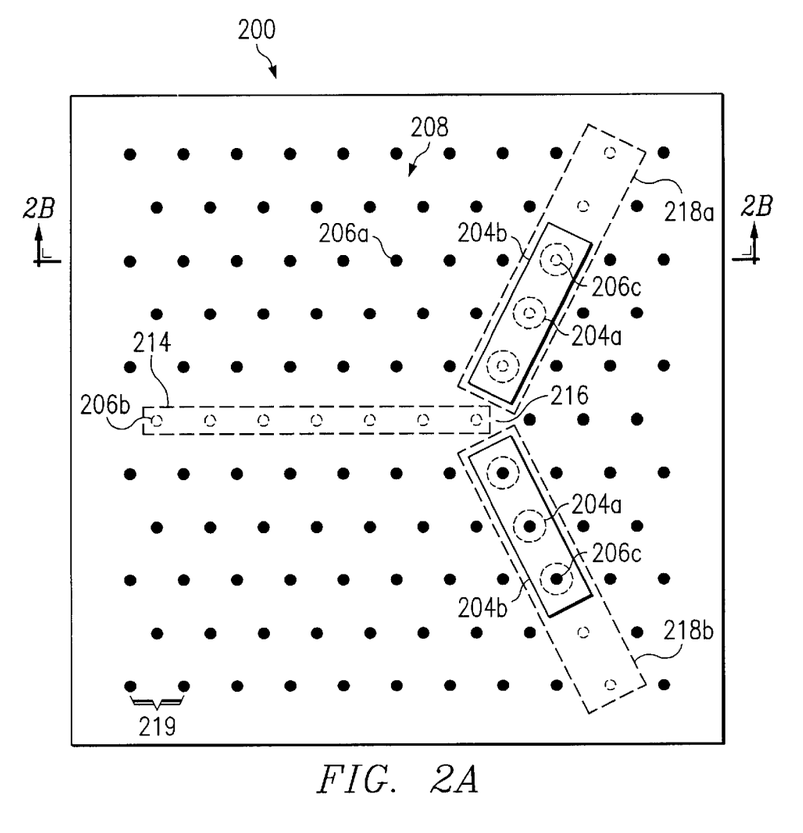
FIGS. 2A and 2B are block diagrams illustrating portions of an exemplary photonic crystal constructed according to the teachings of the present invention.
Figure 2B:
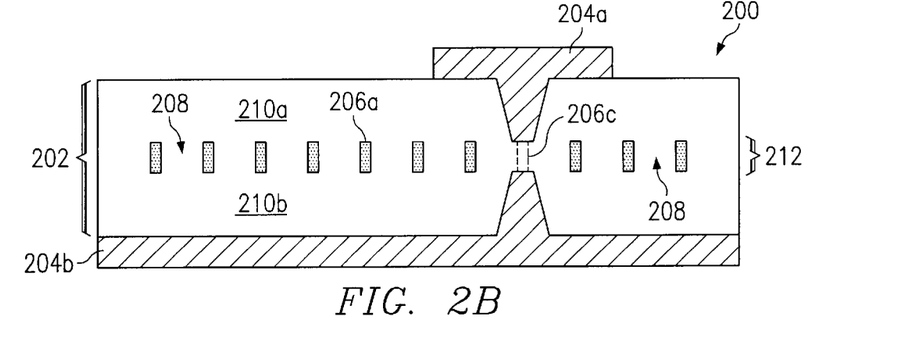

Crystal 102 is coupled to controller 104. In this document, the term "couple" refers to any direct or indirect communication between two or more elements, whether or not those elements are in physical contact with one another. Also, the term "crystal" refers to any structure or structures operable to receive and route optical signals, such as a photonic bandgap crystal. In addition, the term "photonic bandgap" refers to an ability to reduce or eliminate the propagation of light within a range or "band" of frequencies. Crystal 102 receives input optical signals from at least one input line 110 and routes the signals to one or more output lines 112. The routing of signals from input line 110 to output line 112 is conducted by the waveguides 106 in crystal 102. For example, an input signal from input line 110a may be routed to output line 112a or output line 112b, depending on which waveguide 106 is set to allow an optical signal to pass. By adjusting the states of one or more rods 108, crystal 102 may perform different switching functions in switch 100. Crystal 102 may comprise any suitable structure operable to perform switching functions in switch 100. One embodiment of a crystal is shown in FIGS. 2A and 2B, which are described below.

In the illustrated embodiment, crystal 102 includes a plurality of rods 108. Rods 108 represent regions where the refractive index of the region may be altered to create and/or remove defects in crystal 102. In this document, the term "rod" refers to any structure or structures having any suitable size, shape, and/or arrangement and operable to switch between at least a first state and a second state. In one embodiment, the first state is associated with a refractive index that creates a defect in crystal 102, and the second state is associated with a refractive index that does not create a defect in crystal 102. In this embodiment, rod 108 may remain fixed or "latched" in one state until driven into another state.

Rods 108 may comprise any suitable material or materials operable to switch between at least a first state and a second state. Rods 108 may, for example, comprise a chalcogenide, such as $Ge_2Sb_2Te_5$. The chalcogenide may form part or all of rod 108. In this embodiment, the chalcogenide in rod 108 may exist in a different phase depending on whether the rod 108 is in the first state or second state. In a particular embodiment, when rod 108 is in the first state, the chalcogenide is in an amorphous or lower permittivity phase and forms a defect in crystal 102. When rod 108 is in the second state, the chalcogenide is in a polycrystalline or higher permittivity phase, and no defect exists at the point where rod 108 is located in crystal 102. In another embodiment, rod 108 may be polycrystalline in the first state and amorphous in the second state. Other state-phase combinations may be used without departing from the scope of the present invention. Also, materials having other phases and/or states may be used in crystal 102 without departing from the scope of the present invention. In addition, in this document, the terms "higher" and "lower" refer to relative values and do not correspond to particular ranges of values.

In one embodiment, the phase of the rod 108 that creates a defect may depend, at least in part, on the phases of the other rods 108 in crystal 102. For example, if the rods 108 in crystal 102 are in a polycrystalline phase, a defect may be created in crystal 102 by changing at least one of the rods 108 to the amorphous phase. Similarly, if the rods 108 are in an amorphous phase, a defect may be created in crystal 102 by changing at least one of the rods 108 to the polycrystalline phase. While rods 108 may be described in other portions of this document as creating a defect in the amorphous phase, rods 108 may also create defects while in any other suitable phase.

Input lines 110 are operable to provide an input optical signal to crystal 102, and output lines 112 are operable to receive an output optical signal from crystal 102. The output signal received by output line 112 may be all or a portion of the input signal received by crystal 102 through input line 110 and routed through one or more waveguides 106 in crystal 102. Input lines 110 and output lines 112 may comprise fibers, waveguides, free space coupling, focused optical beams, or any other structure operable to communicate optical energy. Input lines 110 and output lines 112 may have any suitable relationship between the lines. For example, input lines 110 and output lines 112 may have a one-to-one relationship, where each input line 110 is associated with one output line 112. Input lines 110 and output lines 112 may also have a one-to-many relationship, a many-to-one relationship, a many-to-many relationship, or any other suitable type of relationship.

Controller 104 is coupled to crystal 102. Controller 104 is operable to reconfigure crystal 102 by switching various rods 108 in crystal 102 between the first and second states of rods 108. In one embodiment, rods 108 in crystal 102 comprise a reversible phase-changeable chalcogenide, where a first phase creates a defect in crystal 102 and a second phase does not create a defect in crystal 102. In this embodiment, controller 104 may place a rod 108 in the first state by heating rod 108 and allowing rod 108 to cool at one rate. Controller 104 may also place a rod 108 in the second state by heating rod 108 and allowing rod 108 to cool at another rate. In a particular embodiment, rod 108 is amorphous in the first state and polycrystalline in the second state. In this embodiment, controller 104 may place rod 108 in the first state by heating rod 108 and allowing rod 108 to cool quickly, and controller 104 may place rod 108 in the second state by heating rod 108 and allowing rod 108 to cool gradually. In this document, the terms "quick" and "gradual" refer to relative time periods and are not meant to correspond to particular durations of time. Also, while controller 104 is described as changing the state of rod 108 by varying the heating and/or cooling rates of rod 108, controller 104 may change the state of rod 108 and the optical characteristics of rod 108 using any other changes to the electrical and/or thermal profile of rod 108. Further, controller 104 may heat and/or cool a rod 108 by directly heating and/or cooling rod 108, by activating appropriate elements in crystal 102 to heat and/or cool rod 108, or in any other suitable manner. In addition, in this document, the terms "cool" and "cooling" include, but are not limited to, actively reducing the temperature of a rod 108, and passively allowing the temperature of a rod 108 to fall. For example, controller 104 may actively reduce the temperature of rod 108 by reducing the current flowing through rod 108 at a particular rate, and controller 104 may passively allow rod 108 to cool by eliminating the current flowing through rod 108. Other methods of cooling rod 108 may be used without departing from the scope of the present invention. By placing a series of rods 108 in the first state, controller 104 may form different waveguides 106 in crystal 102. Controller 104 may comprise any hardware, software, firmware, or combination thereof operable to reconfigure crystal 102.

In a particular embodiment, controller 104 heats and cools a rod 108 in crystal 102 using an electric current. The electric current causes a rod 108 to heat, due to the resistance of rod 108. The rate at which the rod 108 cools may depend on one or more characteristics of the current. For example, in one embodiment, a current having a larger amplitude and smaller duration may cause the rod 108 to cool quickly, while a current having a smaller amplitude and larger duration may cause the rod 108 to cool gradually. In this document, the terms "larger" and "smaller" refer to relative sizes and do not correspond to particular ranges of values. In another embodiment, the rate at which the electric current is reduced controls the rate at which rod 108 cools. Controller 104 may control which state rod 108 enters by varying the characteristics of the electric current. For example, to cause rod 108 to become polycrystalline, the current controlled by controller 104 may cause rod 108 to cool gradually, such as between approximately ten to approximately fifty nanoseconds. To cause rod 108 to become amorphous, the current controlled by controller 104 causes rod 108 to cool quickly, such as between approximately one to approximately two nanoseconds. As a result, different waveguides 106 may be formed in crystal 102 by heating and cooling rods 108 at these different rates. Other embodiments of switch 100 may be used without departing from the scope of the present invention. For example, controller 104 could switch the states of rods 108 using an optical beam, such as from a laser, or any other suitable structure or structures operable to switch the states of rods 108.

Controller 104 may switch rods 108 in crystal 102 between the first and second states under the control of one or more input control signals received over control lines 114. The control signals received over control lines 114 allow controller 104 to identify which rods 108 need to be in the first state and which rods 108 need to be in the second state. In one embodiment, controller 104 includes a library 116 containing a plurality of entries. Each entry corresponds to a configuration of waveguides 106 in crystal 102 to achieve a mapping between one or more input lines 110 and one or more output lines 112. For example, an entry may identify which rods 108 should be in the first and second states to establish particular waveguides 106 in crystal 102. In this embodiment, the control signals received over control lines 114 identify the entry in library 116 that should be used to reconfigure crystal 102. Controller 104 accesses library 116, identifies the selected entry in library 116, and retrieves the identity of the rods 108 that should be in the first and/or second states. After identifying the states of the rods 108 in crystal 102, controller 104 may reconfigure crystal 102.

In another embodiment, controller 104 may use an algorithm 118 to determine the states of rods 108 in crystal 102. When controller 104 receives control signals over control lines 114, controller 104 processes the control signals using algorithm 118. Algorithm 118 performs one or more operations on the control signals and identifies which rods 108 should be in the first state and/or the second state. After identifying the states of rods 108, controller 104 may reconfigure crystal 102. Other methods for identifying which rods 108 are to be placed in the first and second states may be used without departing from the scope of the present invention.

Controller 104 may be coupled to crystal 102 by one or more signal lines 120. Signal lines 120 are operable to transport signals, such as electric currents or optical signals used to reconfigure rods 108, to and from crystal 102. In a particular embodiment, a switchable rod 108 may be coupled to at least two electrodes, and controller 104 may create a voltage differential across the electrodes using signal lines 120. Signal lines 120 may comprise any suitable structure operable to communicate electrical signals used to reconfigure crystal 102.

Although FIG. 1 illustrates one example of an optical switch 100, other embodiments of switch 100 may be used without departing from the scope of the present invention. For example, any number of input lines 110, output lines 112, and control lines 114 may be used with switch 100. Also, any number of rods 108 may be switchable between different states. Further, although FIG. 1 illustrates controller 104 and crystal 102 as separate components of switch 100, controller 104 and crystal 102 could be combined into a single component. In addition, controller 104 and crystal 102 may be fabricated on a single substrate using any suitable technique or techniques to provide an integral photonic device.

FIGS. 2A and 2B are block diagrams illustrating portions of an exemplary photonic crystal 200 constructed according to the teachings of the present invention. Photonic crystal 200 may be useful, for example, in optical switch 100 of FIG. 1. In FIG. 2A, crystal 200 includes a plurality of rods 206 and a plurality of electrodes 204. Other embodiments of crystal 200 may be used without departing from the scope of the present invention.

Rods 206 represent areas of crystal 200 that may reduce or eliminate the propagation of an optical signal through crystal 200 or that may allow the optical signal to propagate through a defect in crystal 200. In one embodiment, at least one rod 206a may be fixed in the second state. These rods 206a reduce or eliminate the propagation of an optical signal through at least a portion of crystal 200. At least one rod 206b may also be fixed in the first state. These rods 206b allow the propagation of the optical signal through at least a portion of crystal 200. In one embodiment, rods 206a and rods 206b have different refractive indices. In a particular embodiment, rods 206a have a refractive index of approximately seven, and rods 206b have a refractive index of approximately four. Other state-refractive index combinations may be used without departing from the scope of the present invention.

At least one rod 206 in crystal 200, such as rod 206c, is a switchable rod. In one state, rod 206c allows an optical signal to propagate through at least a portion of crystal 200, and in another state rod 206c reduces the propagation of the optical signal through crystal 200. The two states of rod 206c may correspond to different refractive indices of rod 206c. In a particular embodiment, when rod 206c is in the first state, the refractive index of rod 206c may be the same or similar to the refractive index of rods 206b. When rod 206c is in the second state, the refractive index of rod 206c may be the same or similar to the refractive index of rods 206a. Other materials having different refractive indices may be used without departing from the scope of the present invention.

In the illustrated embodiment, a series of rods 206b form a waveguide 214 in crystal 200. Waveguide 214 represents a path where optical signals may exist in and propagate through crystal 200. An optical signal may propagate through waveguide 214 until reaching branch 216. Branch 216 represents an area where waveguide 214 divides into two waveguides 218a and 218b. One or more switchable rods 206c may make up the first portion of each waveguide 218, and each waveguide 218 may also include one or more rods 206b. The state of the switchable rods 206c determines whether an optical signal propagating through waveguide 214 follows waveguide 218a and/or waveguide 218b. For example, in one embodiment, if switchable rods 206c in waveguide 218a are amorphous while switchable rods 206c in waveguide 218b are polycrystalline, optical signals would enter waveguide 218a. Switchable rods 206c in waveguide 218b would reduce the propagation of the signals through waveguide 218b. Similarly, if crystal 200 needs to route signals through waveguide 218b, electrodes 204 would switch switchable rods 206c in waveguide 218a to the polycrystalline phase and switchable rods 206c in waveguide 218b to the amorphous phase. Optical signals would then enter waveguide 218b, and switchable rods 206c in waveguide 218a would reduce the propagation of the signals through waveguide 218a. Rods 206a may surround at least a portion of waveguides 214 and 218, which helps to conduct the optical signals through waveguides 214 and 218 and limit the conduction of the optical signals through other portions of crystal 200. Because waveguides 218 may allow or reduce the propagation of optical signals based on the states of switchable rods 206c, waveguides 218 may be referred to as "switchable" waveguides or paths.

Rods 206 may comprise any suitable material or materials. In one embodiment, all rods 206 are composed of the same material operable to switch between at least a first state and a second state. In a particular embodiment, rods 206 comprise a reversible phase-changeable chalcogenide, such as $Ge_2Sb_2Te_5$. In one embodiment, the material forming rod 206a may be fixed in a higher-index phase, the material forming rod 206b may be fixed in a lower-index phase, and the material forming rod 206c may switch between phases. Because the material that forms rods 206a and 206b may be fixed in the higher-index phase and the lower-index phase, respectively, many of the rods 206 in crystal 200 may be configured to operate in the first or second states during fabrication of crystal 200. This may reduce the number of switchable rods 206c in crystal 200 and simplify the operation of crystal 200. This may also allow different waveguide geometries to be formed during fabrication of crystal 200. For example, different waveguides can be formed in crystal 200 during fabrication by fixing at least some of the rods 206 in the lower-index or higher-index phases. At least one of the rods 206 may comprise a switchable rod 206c, which may be switched between states to route optical signals through different waveguides in crystal 200. Any suitable number of rods 206a and 206b may be fixed in the higher-index or lower-index phases, and any suitable number of rods 206c may be switchable between states. In another embodiment, rods 206 may comprise different materials.

Background material 208 separates rods 206. Background material 208 may comprise any suitable material or materials in one or multiple layers. Background material 208 may, for example, comprise a dielectric material such as silicon dioxide or air.

Electrodes 204 are coupled to at least one switchable rod 206c. Electrodes 204 are operable to change the state of one or more rods 206c. For example, in one embodiment, a defect may be formed in crystal 200 by heating and cooling rod 206c at one rate, and defects in crystal 200 may be removed by heating and cooling rod 206c at another rate. In a particular embodiment, rod 206c may be heated using an electric current. The rate at which the rod 206c cools may depend on one or more characteristics of the current, such as the amplitude, duration, and/or rate of reduction. In one embodiment, a pair of electrodes 204a and 204b may be coupled to a switchable rod 206c. In this embodiment, a voltage differential may be applied to the electrodes 204a and 204b, creating a current flowing through rod 206c. The current generates heat due to the resistance of rod 206c. In a particular embodiment, rod 206c is heated by applying a current for between approximately one and approximately two nanoseconds. To place the material forming rod 206c in an amorphous phase, rod 206c is cooled at a rate of between approximately one and approximately two nanoseconds. This may form a defect in crystal 200. To place the material forming rod 206 in the polycrystalline phase, rod 206c is cooled at a rate of between approximately ten and approximately fifty nanoseconds. This may remove a defect from crystal 200. Electrodes 204 may comprise any suitable material or materials in one or multiple layers. Electrodes 204 may, for example, comprise copper, gold, silver, and/or doped polysilicon. Although FIG. 2A illustrates one electrode 204a coupled to each rod 206c and one electrode 204b coupled to three rods 206c, other embodiments of crystal 200 may be used without departing from the scope of the present invention. For example, electrode 204 and/or electrode 204b may be coupled to any number of switchable rods 206c.

The arrangement, size, and shape of rods 206 and the refractive indices of the materials in crystal 200 determine the optical characteristics of crystal 200. For example, crystal 200 prevents light within a certain range or band of frequencies from propagating through crystal 200, unless a defect is formed in crystal 200. The center of the frequency range depends, at least in part, on the center-to-center distance 219 of rods 206. In one embodiment, distance 219 is approximately 0.5 micrometers. By altering one or more characteristics of crystal 200, such as the center-to-center distance 219 of rods 206 or any other suitable characteristics, a crystal 200 may be constructed having properties suitable for a particular application. For example, a crystal 200 having normalized bandgaps of fifteen to twenty-five percent or more is achievable, and localized states may exist near the center of the bandgaps. In one embodiment, the center-to-center distance 219 of rods 206 is 0.5 micrometers, the radius of rods 206 is 0.11 micrometers, the height of rods 206 is 0.6 micrometers, and the thickness of cladding 210 is 3 micrometers. This provides a normalized bandgap of approximately fifteen percent. In another embodiment, the center-to-center distance 219 of rods 206 is 0.5 micrometers, the radius of rods 206 is 0.08 micrometers, the height of rods 206 is 0.9 micrometers, and the thickness of cladding 210 is 3 micrometers. This provides a normalized bandgap of approximately twenty-five percent. Other embodiments of crystal 200 may be used without departing from the scope of the present invention.

Because crystal 200 in FIG. 2A has a single branch 216 dividing waveguide 214 into two waveguides 218, crystal 200 acts as a 1×2 optical switch. An input signal may take one of two paths through crystal 200. Cascading the 1×2 switches produces a 1×N switch, meaning that an input signal may take one of N paths through the switch. Cascading N 1×N switches in parallel produces half of a N×N switch. In one embodiment, each 1×2 switch may occupy less than 10 square micrometers of space, and up to one million 1×2 switches may be placed in a square centimeter.

FIG. 2B illustrates the cross-section of crystal 200 along line A—A in FIG. 2A. As illustrated in FIG. 2B, crystal 200 includes a waveguide area 202 and two electrodes 204a and 204b. Waveguide area 202 represents the area of crystal 200 where optical signals may be guided through waveguides in crystal 200. In the illustrated embodiment, waveguide area 202 includes rods 206, background material 208, and a confinement cladding 210 disposed around rods 206.

In the illustrated embodiment, confinement claddings 210a and 210b are disposed on top and bottom of rods 206. Each confinement cladding 210 may confine optical signals traveling through crystal 200 to the region 212 in which rods 206 are located. This helps to prevent the optical signals from radiating out of crystal 200. Confinement cladding 210 may comprise any suitable material or materials in one or multiple layers. In one embodiment, confinement cladding 210 comprises the same material as background material 208, such as silicon dioxide. In another embodiment, confinement cladding 210 and background material 208 comprise different materials. In a particular embodiment, confinement cladding 210 may have a refractive index that is less than or equal to the refractive index of background material 208.

Electrodes 204a and 204b may have any suitable size and/or shape in crystal 200. In the illustrated embodiment, each electrode 204 protrudes through a confinement cladding 210 in order to contact rod 206c. In this embodiment, the use of a protruding electrode 204 may help to reduce the perturbation of crystal 200 caused by the presence of a conductive material within waveguide area 202 of crystal 200. Other electrodes 204 may be used without departing from the scope of the present invention.

The crystal 200 illustrated in FIGS. 2A and 2B may be formed by any suitable process or processes. In one embodiment, rods 206 in crystal 200 may be formed using interference lithography. In a particular embodiment, after rods 206 are formed, one or more rods 206 may be fixed in the first state and one or more rods 206 may be fixed in the second state. By fixing at least some of rods 206 in the first and second states, different waveguides 214 and 218 may be formed in crystal 200. One or more electrodes 204 may also be formed in crystal 200, and electrodes 204 may be used to switch one or more rods 206 between the first and second states. By overlaying the electrodes on switchable rods 206, the waveguides in crystal 200 may be reconfigured.

Although FIGS. 2A and 2B illustrate one embodiment of crystal 200, various changes may be made to crystal 200 without departing from the scope of the present invention. For example, any suitable number of waveguides 214, branches 216, and waveguides 218 may be used in crystal 200. Any number of rods 206 may be used in crystal 200, and any number of rods 206 may be fixed in the first state and/or the second state. Also, any number of rods 206 may comprise switchable rods 206c, and any suitable number of switchable rods 206c may be used to block waveguides 218 in crystal 200. Further, while FIG. 2A illustrates rods 206 arranged in a triangular lattice within a planar region 212 of crystal 200, other arrangements, such as rectangular and honeycomb lattices, may be used in crystal 200. In addition, other methods may be used to change the state of rods 206c in place of electrodes 204. For example, one or more Vertical Cavity Surface Emitting Lasers (VCSEL) and focusing lenses to target the lasers may be used to change the state of rods 206c. Other changes may be used without departing from the scope of the present invention.

FIGS. 3A–3H are block diagrams illustrating an exemplary series of steps in manufacturing a photonic crystal 300. The steps shown in FIGS. 3A–3H are for illustration only. Other fabrication methods may be used without departing from the scope of the present invention.

Figure 3A:
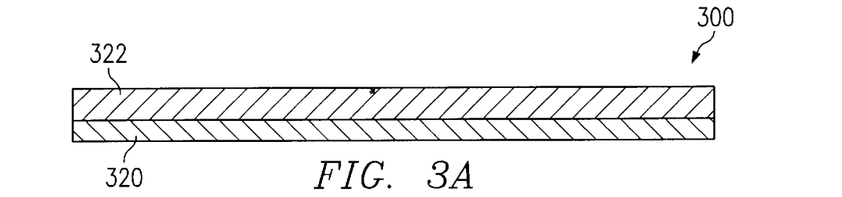
FIGS. 3A–3H are block diagrams illustrating an exemplary series of steps in manufacturing a photonic crystal.

In FIG. 3A, a layer 322 of a conductive material is deposited on a substrate 320. Substrate 320 may comprise any suitable material or materials in one or multiple layers, such as a layer of silicon. Layer 322 may comprise any suitable conductive material or materials in one or multiple layers, such as a layer of gold, silver, copper, and/or doped polysilicon. Layer 322 may be deposited on substrate 320 using any suitable method.

Figure 3B:
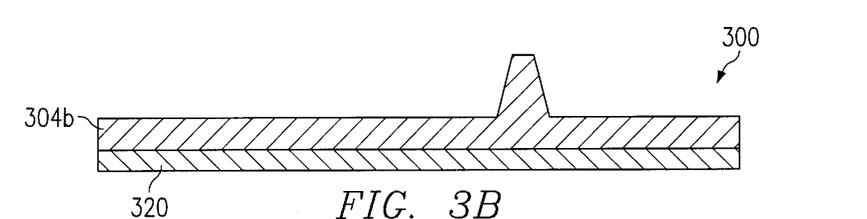
Figure 3C:
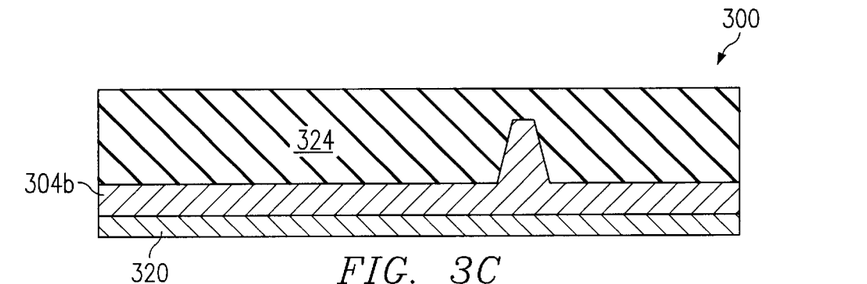

In FIG. 3B, layer 322 is formed into the shape of an electrode 304b. Any suitable method, such as a pattern and etch, may be used to form electrode 304b. In FIG. 3C, a layer 324 of a dielectric material is deposited on electrode 304b. Layer 324 may comprise any suitable dielectric material or materials in one or multiple layers, such as a layer of silicon dioxide. Layer 324 may be formed using any suitable method, such as chemical vapor deposition.

Figure 3D:
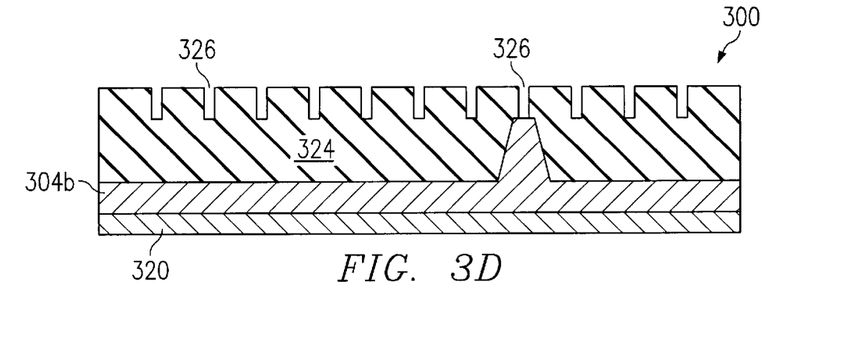
Figure 3E:
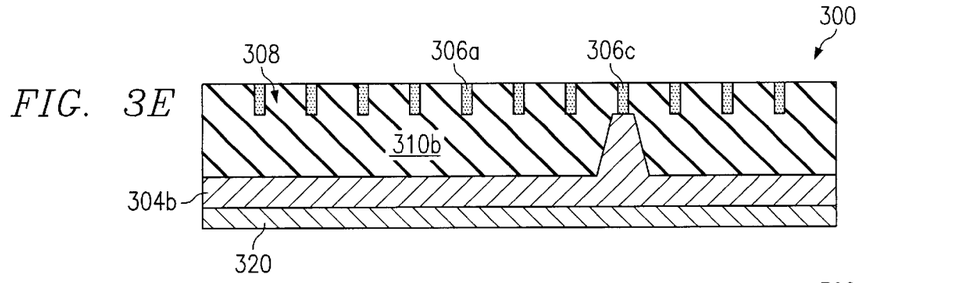

In FIG. 3D, layer 324 is planarized, and a plurality of cavities 326 are formed in layer 324. The cavities 326 may be formed to approximately conform to the shape of rods 206. Cavities 326 could also be formed to any other suitable shape in crystal 300. Cavities 326 may be formed in layer 324 using any suitable method, such as a pattern and etch, a photomask, or a three-beam interference lithography technique. Cavities 326 may have any suitable geometric pattern, such as a triangular, rectangular, or honeycomb lattice. In FIG. 3E, rods 306 are formed in cavities 326. Rods 306 may, for example, be formed by depositing a layer of a chalcogenide in cavities 326 and then planarizing the material. This forms rods 306 separated by dielectric material 308 and a confinement cladding 310b disposed under rods 306. Although FIG. 3E illustrates the material from layer 324 separating rods 306, a different material than layer 324 could also be used. For example, layer 324 could be planarized, an additional material could be disposed on layer 324, and cavities 326 could be formed in the additional layer.

One or more of rods 306 may be placed into the first state or the second state at this point. For example, rods 306a could be placed in the second state. Switchable rods 306c may or may not be initially placed in the first or second states at this step or later. Rods 306 could be placed in one of the states through laser irradiation or any other suitable method.

Figure 3F:
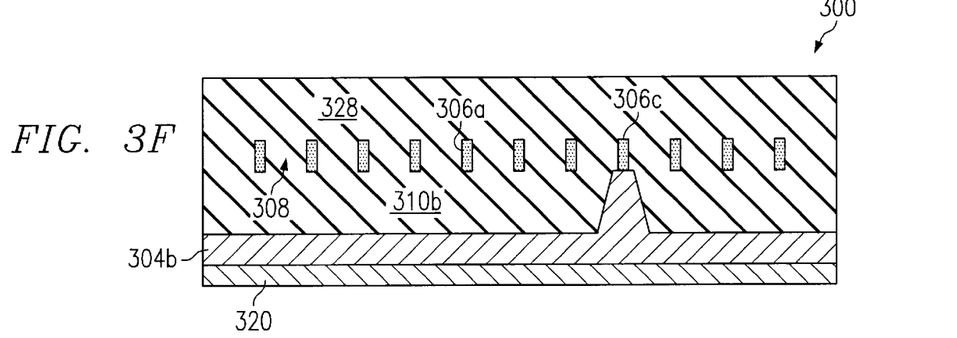
Figure 3G:
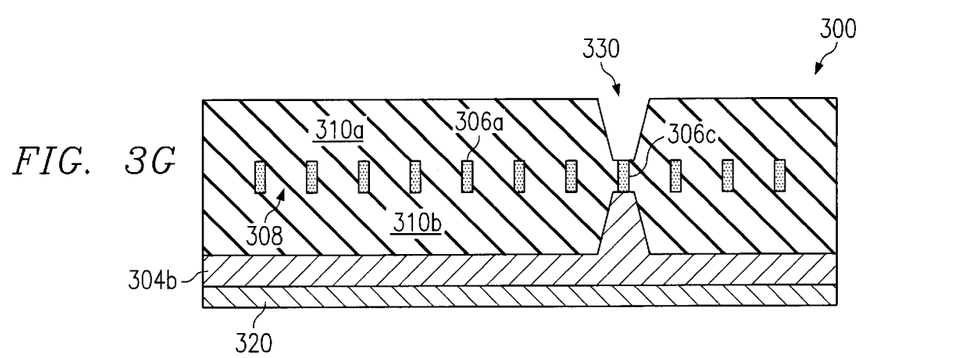
Figure 3H:
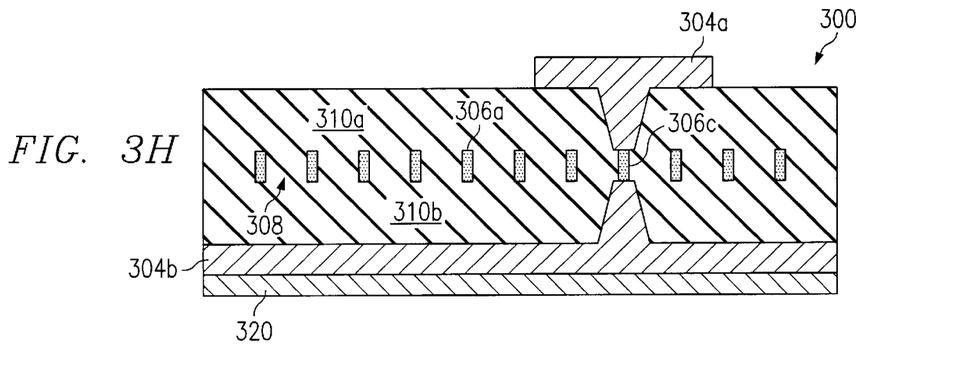

In FIG. 3F, a layer 328 of a dielectric material is deposited on rods 306. Layer 328 may comprise any suitable dielectric material or materials in one or multiple layers, such as a layer of silicon dioxide. Layer 328 may be formed using any suitable method, such as chemical vapor deposition. In FIG. 3G, a cavity 330 is formed in layer 328. The cavity 330 may be formed to approximately conform to the shape of electrode 204a. Cavity 330 may be formed in layer 328 using any suitable method, such as a pattern and etch. In FIG. 3H, electrode 304a is formed in cavity 330. Electrode 304a may be formed, for example, by depositing a conductive material in and around cavity 330 and forming the material into electrode 304a.

Although FIGS. 3A–3H illustrate an exemplary series of steps in the formation of a photonic crystal 300, various changes may be made to the series of steps without departing from the scope of the present invention. For example, in another embodiment, an optical device may use one or more lasers to switch switchable rods 306c from one state to another, and electrodes 304 need not be formed in crystal 300. Also, other suitable fabrication techniques may be used to form crystal 300 without departing from the scope of the present invention.

Figure 4A:
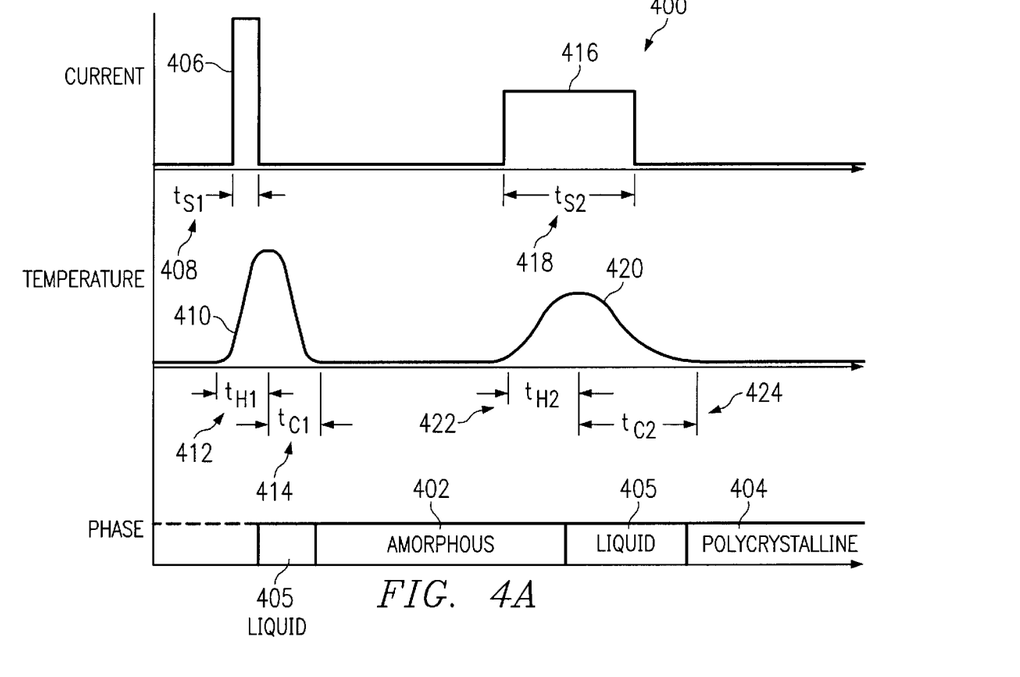
FIGS. 4A and 4B are timing diagrams illustrating the reconfiguration of a photonic crystal according to the teachings of the present invention.
Figure 4B:
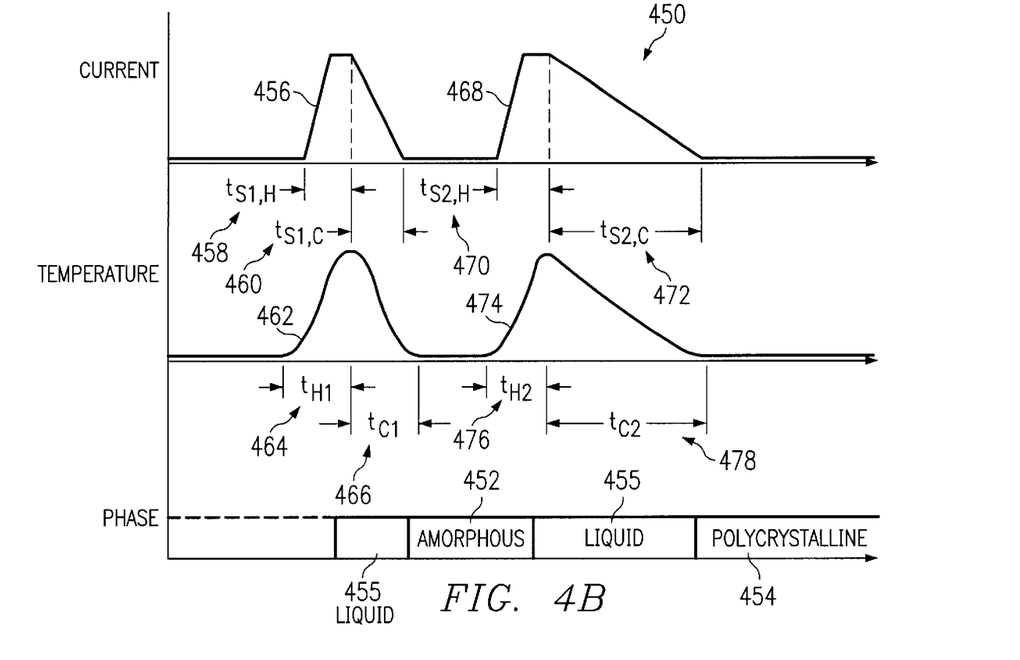

FIGS. 4A and 4B are timing diagrams illustrating the reconfiguration of a photonic crystal according to the teachings of the present invention. Although FIGS. 4A and 4B are described with respect to crystal 200 of FIGS. 2A and 2B, the same or similar timing may be used in crystal 102 of FIG. 1, crystal 300 of FIGS. 3A through 3H, and any other suitable photonic crystal.

In FIG. 4A, timing diagram 400 illustrates how a current applied to a rod 206 changes the temperature of rod 206, which causes a change in the phase of the material forming rod 206. The current applied to rod 206 may, for example, be delivered to rod 206 by a controller, such as controller 104, through one or more signal lines 120 and associated electrodes 204. The material in rod 206 may have a first phase 402, which creates a defect in crystal 200, and a second phase 404, which does not form a defect in crystal 200. In the illustrated embodiment, a rod 206 in the first phase 402 is amorphous, and a rod 206 in the second phase 404 is polycrystalline. Other phase-defect combinations may be used without departing from the scope of the present invention.

As shown in FIG. 4A, to place the material in rod 206 in the first phase 402, a current 406 is applied to rod 206 for a time 408. This may include, for example, a controller such as controller 104 providing a square wave to one of the electrodes 204 coupled to rod 206. In one embodiment, current 406 is applied to rod 206 for a time 408 of between one to two nanoseconds. The amplitude of current 406 may depend, at least in part, on the amount of material forming rod 206. Current 406 increases the temperature 410 of rod 206 during a time 412. Time 412 may, for example, be between one and two nanoseconds. In one embodiment, current 406 increases temperature 410 of rod 206 to the melting point of rod 206. In a particular embodiment, rod 206 comprises a chalcogenide such as $Ge_2Sb_2Te_5$, and current 406 heats rod 206 to at least 620° Centigrade. This causes the material in rod 206 to enter a third phase 405 in which the material in rod 206 becomes liquid. After time 412, the temperature 410 of rod 206 decreases during a time 414. In one embodiment, time 414 represents a time of one to two nanoseconds. Because the temperature 410 of rod 206 falls quickly, the material in rod 206 enters the first phase 402, and a defect is formed in crystal 200.

To place the material in rod 206 in the second phase 404, a current 416 is applied to rod 206 for a time 418. This may include controller 104 providing a square wave to one of the electrodes 204 coupled to rod 206. In one embodiment, current 416 is applied to rod 206 for a time 418 of between ten to fifty nanoseconds. Current 416 increases the temperature 420 of rod 206 during a time 422. Time 422 may, for example, be between one and two nanoseconds. This may cause the material in rod 206 to enter the liquid phase 405. The temperature 420 of rod 206 then decreases during a time 424. In one embodiment, time 424 represents a time of ten to fifty nanoseconds. This reduces the temperature 420 of rod 206 gradually, placing the material in rod 206 in the second phase 404. As a result, no defect is formed in crystal 200 at the location of rod 206.

In FIG. 4B, timing diagram 450 illustrates how another current applied to rod 206 changes the temperature of rod 206 and the phase of the material forming rod 206. Rod 206 may have a first phase 452, which creates a defect in crystal 200, and a second phase 454, which does not form a defect in crystal 200. In the illustrated embodiment, rod 206 is amorphous in the first phase 452 and polycrystalline in the second phase 454. Other phase-defect combinations may be used without departing from the scope of the present invention.

As shown in FIG. 4B, to place the material in rod 206 in the first phase 452, a current 456 is applied to rod 206 for a time 458. This may include, for example, creating a voltage differential between the electrodes 204 coupled to rod 206 to establish current 456 through rod 206. After that, current 456 is reduced during a time 460. In one embodiment, time 458 and time 460 each represents a period of one to two nanoseconds. The amplitude of current 456 may depend, at least in part, on the amount of material forming rod 206. Current 456 causes the temperature 462 of rod 206 to increase during a time 464 and then decrease during time 466. In one embodiment, current 456 increases temperature 462 of rod 206 to the point where the material in rod 206 melts and enters a liquid phase 455. In a particular embodiment, time 464 and time 466 each represents a time of one to two nanoseconds. Because the temperature 462 of rod 206 falls quickly, the material in rod 206 enters the first phase 452, and a defect is formed in crystal 200.

To place the material in rod 206 in the second phase 454, a current 468 is applied to rod 206 for a time 470, and current 468 is reduced during a time 472. In one embodiment, time 470 represents a period of one to two nanoseconds, and time 472 represents a time of ten to fifty nanoseconds. Current 468 causes the temperature 474 of rod 206 to increase during a time 476 and then decrease during time 478. In one embodiment, time 476 represents a period of one to two nanoseconds, and time 478 represents a period of ten to fifty nanoseconds. The current 468 causes the material in rod 206 to enter the liquid phase 455, and the gradual reduction in temperature 474 of rod 206 causes the material in rod 206 to enter the second phase 454. As a result, no defect is formed at rod 206 in crystal 200.

While FIGS. 4A and 4B illustrate example currents that may be used to reconfigure a rod 206, various changes may be made to FIGS. 4A and 4B without departing from the scope of the present invention. For example, the currents, times, temperatures, and phases shown in FIGS. 4A and 4B are for illustration only. Other and/or additional currents, times, temperatures, and/or phases may be used without departing from the scope of the present invention. Also, while the material in rods 206 is shown to have three phases, rods 206 may be formed from a material having any suitable number of phases. Further, any suitable currents may be used to heat rods 206 and/or cool rods 206. In one embodiment, any currents operable to allow rod 206 to cool at different rates and enter different phases may be used without departing from the scope of the present invention.

Figure 5:
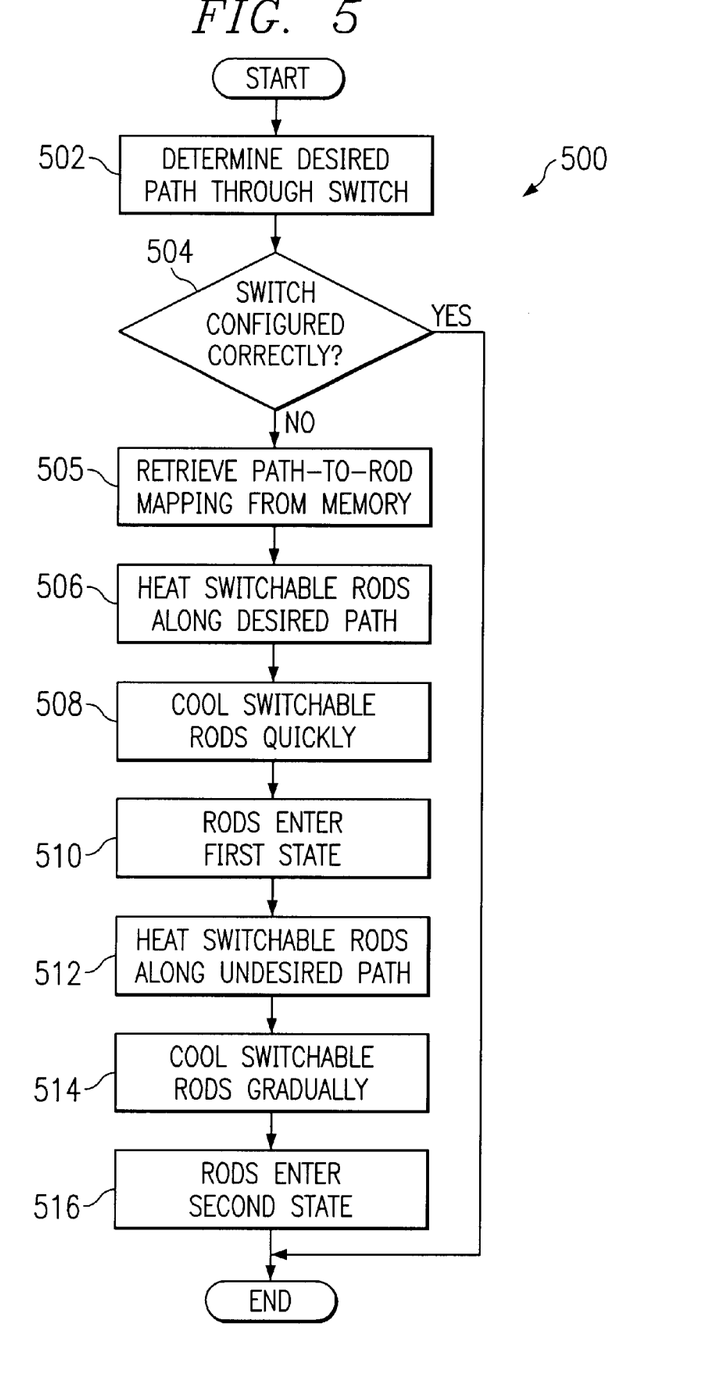
FIG. 5 is a flow diagram illustrating an exemplary method for reconfiguring an optical switch according to the teachings of the present invention.

FIG. 5 is a flow diagram illustrating an exemplary method 500 for reconfiguring an optical switch according to the teachings of the present invention. Although FIG. 5 is described with respect to crystal 200 of FIGS. 2A and 2B, the same or similar method may be used by switch 100 of FIG. 1, crystal 300 of FIGS. 3A through 3H, or any other suitable optical switch.

A controller or other logic, such as a controller 104, determines the desired path through crystal 200 at step 502. This may include, for example, determining how an optical signal is to be routed through the waveguides 214 and 218 in crystal 200. The controller or other logic determines if crystal 200 is configured correctly at step 504. This may include, for example, determining if a waveguide 214 branches toward the desired waveguide 218 in crystal 200.

If crystal 200 is configured correctly, method 500 ends. Crystal 200 does not need to be reconfigured. Otherwise, controller 104 retrieves a path-to-rod mapping from memory at step 505. The path-to-rod mapping may, for example, be stored as an entry in library 116 or computed by algorithm 118. Controller 104 heats the switchable rods 206c along the desired path in crystal 200 at step 506. The desired path may represent one of the waveguides 218 that travels through crystal 200 in the proper direction, such as a waveguide 218 leading toward the final destination of the optical signal. The switchable rods 206c along the desired path may be heated, for example, by applying a current to the rods 206c through the electrodes 204 coupled to the rods 206c. The current may last for any suitable length of time, such as one to two nanoseconds. The switchable rods 206c along the desired path are cooled quickly at step 508. This may include, for example, controller 104 cooling the rods 206c quickly by controlling at least one of the duration of the current, the amplitude of the current, and the rate at which the current is reduced. Because of the quick cooling rate, switchable rods 206c enter the first state at step 510. The material that forms rods 206c may, for example, enter an amorphous phase, and defects form at the locations of switchable rods 206c. This reconfigures crystal 200 by opening the desired path through crystal 200.

Controller 104 also heats the switchable rods 206c along the undesired path in crystal 200 at step 512. The undesired path may represent one of the waveguides 218 that travels through crystal 200 in an improper direction, such as a waveguide 218 that diverges from the desired path and leads away from the final destination of the optical signal. The switchable rods 206c along the undesired path may be heated, for example, by applying a current to the rods 206c. The switchable rods 206c along the undesired path are cooled gradually at step 514. This may include, for example, controller 104 cooling the rods 206c gradually by controlling at least one of the duration of the current, the amplitude of the current, and the rate at which the current is reduced. Because of the gradual cooling rate, switchable rods 206c enter the second state at step 516. The material that forms rods 206c may, for example, enter a polycrystalline phase, and defects are removed from crystal 200. This reconfigures crystal 200 by closing the undesired paths through crystal 200. At this point, crystal 200 has been reconfigured to guide an optical signal in a desired path through crystal 200. At a branch 216 in crystal 200, the desired path has been opened and the undesired path has been closed.

Although FIG. 5 illustrates one example of a method 500 for reconfiguring an optical switch, various changes may be made to method 500 without departing from the scope of the present invention. For example, although FIG. 5 illustrates a series of steps 506–516 to reconfigure crystal 200, various steps may be performed in parallel. As a particular example, steps 506–510 that open the desired path through crystal 200 could be performed in parallel with steps 512–516 that close the undesired path through crystal 200.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A photonic crystal, comprising:
    a first path comprising a plurality of first regions, at least one of the first regions set to a first state to allow an optical signal to propagate through at least a portion of the crystal;
    a second path comprising a plurality of second regions, at least one of the second regions set to the first state;
    a third path coupling the first path and the second path and providing the optical signal for propagation through at least one of the first and second paths;
    a first actuator coupled to at least one of the first regions, the first actuator operable to switch the first region between the first state and a second state, the second state reducing the propagation of the optical signal through at least a portion of the crystal; and
    a second actuator coupled to at least one of the second regions, the second actuator operable to switch the second region between the first state and the second state.

2. The photonic crystal of claim 1, wherein the first region is amorphous in the first state and polycrystalline in the second state.

3. The photonic crystal of claim 1, wherein:
    the first region enters the first state when heated and then cooled at a first rate; and
    the first region enters the second state when heated and then cooled at a second rate.

4. The photonic crystal of claim 3, wherein:
    the first rate is between approximately one and approximately two nanoseconds; and
    the second rate is between approximately ten and approximately fifty nanoseconds.

5. The photonic crystal of claim 1, wherein the first actuator comprises two electrodes coupled to the first region.

6. The photonic crystal of claim 5, wherein a current flowing through the first actuator switches the first region between the first state and the second state.

7. The photonic crystal of claim 6, wherein the current is generated by creating a voltage differential between the electrodes.

8. The photonic crystal of claim 6, wherein:

the current heats the first region; and the first region enters the first state or the second state based on a rate at which the first region cools.

9. The photonic crystal of claim 8, wherein the rate at which the first region cools depends on at least one of an amplitude of the current, a duration of the current, and a rate at which the current is reduced.

10. The photonic crystal of claim 1, wherein the first and second regions comprise a chalcogenide.

11. The photonic crystal of claim 1, wherein the first and second regions comprise $Ge_2Sb_2Te_5$.

12. The photonic crystal of claim 1, wherein the first and second regions comprise rods.

13. The photonic crystal of claim 1, wherein the first and second regions are planar.

14. The photonic crystal of claim 1, further comprising at least one confinement cladding disposed around the first and second regions and operable to reduce the propagation of the optical signal through the cladding.

15. The photonic crystal of claim 1, wherein the first and second regions form a triangular lattice.

16. The photonic crystal of claim 1, wherein the crystal has a normalized bandgap of between fifteen percent and twenty five percent.

17. The photonic crystal of claim 1, wherein the crystal has an area of ten square micrometers or less.

18. An optical switch, comprising:

a photonic crystal comprising:

a first path comprising a plurality of first regions, at least one of the first regions set to a first state to allow an optical signal to propagate through at least a portion of the crystal;

a second path comprising a plurality of second regions, at least one of the second regions set to the first state;

a third path coupling the first path and the second path and providing the optical signal for propagation through at least one of the first and second paths;

a first actuator coupled to at least one of the first regions; and a second actuator coupled to at least one of the second regions; and a controller coupled to the first and second actuators, the controller operable to switch the first and second regions between the first state and a second state, the second state reducing the propagation of the optical signal through at least a portion of the crystal.

19. The optical switch of claim 18, wherein:

the first region enters the first state when heated and then cooled at a first rate; and the first region enters the second state when heated and then cooled at a second rate.

20. The optical switch of claim 19, wherein:

the first rate is between approximately one and approximately two nanoseconds; and the second rate is between approximately ten and approximately fifty nanoseconds.

21. The optical switch of claim 18, wherein:

the first actuator comprises two electrodes coupled to the first region; and the controller is operable to generate a voltage differential across the electrodes to create a current that heats the first region.

22. The optical switch of claim 21, wherein:

the first region enters the first state or the second state based on a rate at which the first region cools; and the rate at which the first region cools depends on at least one of an amplitude of the current, a duration of the current, and a rate at which the current is reduced.

23. The optical switch of claim 18, wherein the first and second regions comprise a chalcogenide.

24. The optical switch of claim 18, wherein the controller is operable to determine the state of the first and second regions based on an input control signal.

25. The optical switch of claim 18, wherein:

the first, second, and third paths form a 1×2 switch;

the crystal comprises at least one million 1×2 switches; and the switches have a combined area of one square centimeter or less.

26. A method for reconfiguring an optical switch, comprising:

selecting a first path through a photonic crystal, the crystal comprising the first path and a second path, the first path comprising a plurality of first regions, the second path comprising a plurality of second regions, the crystal also comprising a third path coupling the first path and the second path and providing an optical signal for propagation through one of the first and second paths;

heating at least one of the first regions and at least one of the second regions;

cooling the first region at a first rate to place the first region in a first state, the first state allowing propagation of the optical signal through at least a portion of the crystal; and cooling the second region at a second rate to place the second region in a second state, the second state reducing the propagation of the optical signal through at least a portion of the crystal.

27. The method of claim 26, wherein:

the first rate is between approximately one and approximately two nanoseconds; and the second rate is between approximately ten and approximately fifty nanoseconds.

28. The method of claim 26, wherein the first and second regions comprise a chalcogenide.

29. The method of claim 26, further comprising receiving an input control signal; and wherein selecting the first path through the photonic crystal comprises selecting the first path using the input control signal.

30. The method of claim 26, wherein heating at least one of the first regions comprises generating a current through the first region.

31. The method of claim 30, wherein:

two electrodes are coupled to the first region; and generating the current through the first region comprises generating a voltage differential across the electrodes.

32. The method of claim 30, wherein:

the first region enters the first state or the second state based on a rate at which the first region cools; and the rate at which the first region cools depends on at least one of an amplitude of the current, a duration of the current, and a rate at which the current is reduced.

33. A photonic crystal, comprising:

a first path comprising a plurality of first rods, at least one of the first rods comprising a chalcogenide and set to a first state;

a second path comprising a plurality of second rods, at least one of the second rods comprising a chalcogenide and set to the first state;

a third path coupling the first path and the second path and providing an optical signal for propagation through at least one of the first and second paths;

at least one first electrode coupled to at least one of the first rods and operable to switch the first rod between the first state and a second state;

at least one second electrode coupled to at least one of the second rods and operable to switch the second rod between the first state and the second state;

the first state allowing propagation of the optical signal through at least a portion of the crystal, the first and second rods entering the first state when heated and then cooled at a rate of between approximately one and approximately two nanoseconds;

the second state reducing the propagation of the optical signal through at least a portion of the crystal, the first and second rods entering the second state when heated and then cooled at a rate of between approximately ten and approximately fifty nanoseconds;

the first rod heated by an electric current flowing through the first electrode, the second rod heated by an electric current flowing through the second electrode, the rate at which the first and second rods cool depending on at least one of an amplitude of the current, a duration of the current, and a rate at which the current is reduced.

34. An optical switch, comprising:

a photonic crystal comprising:

a first path comprising a plurality of first rods, at least one of the first rods comprising a chalcogenide and set to a first state;

a second path comprising a plurality of second rods, at least one of the second rods comprising a chalcogenide and set to the first state;

a third path coupling the first path and the second path and providing an optical signal for propagation through at least one of the first and second paths;

at least one first electrode coupled to at least one of the first rods and operable to switch the first rod between the first state and a second state;

at least one second electrode coupled to at least one of the second rods and operable to switch the second rod between the first state and the second state;

the first state allowing propagation of the optical signal through at least a portion of the crystal, the first and second rods entering the first state when heated and then cooled at a rate of between approximately one and approximately two nanoseconds; and the second state reducing the propagation of the optical signal through at least a portion of the crystal, the first and second rods entering the second state when heated and then cooled at a rate of between approximately ten and approximately fifty nanoseconds; and a controller operable to switch the first and second rods between the first state and the second state, the controller operable to heat at least one of the first or second rods by generating a current through the first or second electrodes, the controller operable to cool the rod at at least two rates by varying at least one of an amplitude of the current, a duration of the current, and a rate at which the current is reduced.

35. A method for reconfiguring an optical switch, comprising:

selecting a first path through a photonic crystal, the crystal comprising the first path and a second path, the first path comprising a plurality of first rods, the second path comprising a plurality of second rods, the first and second rods comprising a chalcogenide, the crystal also comprising a third path coupling the first path and the second path and providing an optical signal for propagation through one of the first and second paths;

generating a current through at least one of the first rods and a current through at least one of the second rods, the currents operable to heat the rods;

cooling the first rod at a rate of between approximately one and approximately two nanoseconds to place the first rod in a first state, the first state allowing propagation of the optical signal through at least a portion of the crystal;

cooling the second rod at a rate of between approximately ten and approximately fifty nanoseconds to place the second rod in a second state, the second state reducing the propagation of the optical signal through at least a portion of the crystal; and the rate at which a rod cools depending on at least one of an amplitude of the current flowing through the rod, a duration of the current flowing through the rod, and a rate at which the current flowing through the rod is reduced.

* * * * *